US012034660B2

(12) United States Patent
Frenne et al.

(10) Patent No.: US 12,034,660 B2
(45) Date of Patent: Jul. 9, 2024

(54) COEXISTENCE OF REFERENCE SIGNALS IN WIRELESS COMMUNICATION NETWORKS

(71) Applicant: TELEFONAKTIEBOLAGET LM ERICSSON (PUBL), Stockholm (SE)

(72) Inventors: Mattias Frenne, Uppsala (SE); Lars Lindbom, Karlstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 506 days.

(21) Appl. No.: 17/279,983

(22) PCT Filed: Sep. 25, 2019

(86) PCT No.: PCT/IB2019/058131
§ 371 (c)(1),
(2) Date: Mar. 25, 2021

(87) PCT Pub. No.: WO2020/065553
PCT Pub. Date: Apr. 2, 2020

(65) Prior Publication Data
US 2022/0038234 A1  Feb. 3, 2022

Related U.S. Application Data

(60) Provisional application No. 62/738,434, filed on Sep. 28, 2018.

(51) Int. Cl.
H04L 5/00 (2006.01)
(52) U.S. Cl.
CPC ................ H04L 5/0048 (2013.01)

(58) Field of Classification Search
CPC ... H04L 5/0048; H04L 12/413; H04L 27/261; H04L 2025/03777; H04W 74/08; H04W 28/0865; H04W 72/121
See application file for complete search history.

(56) References Cited

U.S. PATENT DOCUMENTS 8,724,545 B2  5/2014 Dayal
2018/0014255 A1  1/2018 Pelletier et al.
(Continued)

FOREIGN PATENT DOCUMENTS

CN  105706385 A  6/2016
EP  3509235 A2  7/2019
(Continued)

OTHER PUBLICATIONS

Huawei, Hisilicon, "Consideration of NR Signals and Channels Mapping Around LTE CRS", 3GPP TSG RAN WG1 NR Ad-Hoc Meeting, R1-1700402 Spokane, USA, Jan. 16-20, 2017.
(Continued)

Primary Examiner — Kibrom T Hailu
(74) Attorney, Agent, or Firm — Weisberg I.P. Law, P.A.

(57) ABSTRACT

Radio network node, wireless device, and related methods are described. According to one aspect, when a first radio access technology and a second radio access technology are coexisting on the same carrier, the symbol location of the reference signals of the first radio access technology may be moved or changed when the reference signals of the first radio access technology collide with the reference signals of the second radio access technology.

20 Claims, 11 Drawing Sheets

(56) References Cited

U.S. PATENT DOCUMENTS

| | | | |
|---|---|---|---|
| 2018/0070369 A1* | 3/2018 | Papasakellariou | H04W 56/00 |
| 2018/0131489 A1 | 5/2018 | Ly | |
| 2018/0198582 A1 | 7/2018 | Andersson | |
| 2019/0334691 A1* | 10/2019 | Bendlin | H04L 5/1469 |
| 2019/0387547 A1* | 12/2019 | Shin | H04W 74/0866 |
| 2020/0344751 A1* | 10/2020 | Harada | H04W 56/0015 |

FOREIGN PATENT DOCUMENTS

| | | |
|---|---|---|
| RU | 2504086 C1 | 1/2014 |
| WO | 2012082220 A1 | 6/2012 |
| WO | 2017136079 A1 | 8/2017 |
| WO | 2018080381 A1 | 5/2018 |
| WO | 2018083375 A1 | 5/2018 |
| WO | WO-2018083375 A1 * | 5/2018 |
| WO | 2018104912 A1 | 6/2018 |
| WO | 2018125686 A2 | 7/2018 |
| WO | 2018144337 A1 | 8/2018 |

OTHER PUBLICATIONS

3GPP TS 38.211 V15.2.0 (Jun. 2018), NR; Physical channels and modulation (Release 15) pp. 1-96 https://www.3gpp.org/ftp/Specs/archive/38_series/38.211.

3GPP TS 38.331 V15.2.1 (Jun. 2018), NR; Radio Resource Control (RRC) protocol specification (Release 15) pp. 1-303. https://www.3gpp.org/ftp/Specs/archive/38_series/38.331.

Ericsson, "NR_newRAT-Core", 3GPP TSG-WG2 Meeting #102AH, R2-1810388, Montreal, Canada, Jul. 2-6, 2018. https://portal.3gpp.org/ngppapp/CreateTDoc.aspx?mode=view&contributionUid=R2-1810388.

3GPP TS 38.214 V15.2.0 (Jul. 2018), 5G; NG-RAN; Physical layer procedures for data (3GPP Ts 38.214 version 15.2.0 Release 15) https://www.3gpp.org/ftp/Specs/archive/38_series/38.214.

LG Electronics, 3GPP TSG RAN WG1 meeting #87, On coexistence of NR and LTE, R1-1611861, Reno, USA Nov. 14-18, 2016. pp. 1-4. https://www.3gpp.org/ftp/tsg_ran/WG1_RL1/TSGR1_87/Docs.

International Search Report and Written Opinion issued on applicant's corresponding PCT application PCT/IB2019/058131 pp. 1-14.

NTT Docomo, Inc., "Updated work plan for Rel-15 NR WI", 3GPP TSG RAN WG1 Meeting 91, R1-1720787, Reno, USA, Nov. 27-Dec. 1, 2017.

* cited by examiner

Single-symbol DMRS    Double-symbol DMRS

0.

1.

2.

Indexing relative start of slot $l_0 \in \{2,3\}$ (MIB)

$l_1, l_2, l_3$ depends on PDSCH durations

3.

Locations of additional DMRS vs. PDSCH durations

|         | 4-7  | 8,9  | 10,11 | 12    | 13,14  |
|---------|------|------|-------|-------|--------|
| $l_1$   | -    | 7    | 9     | 9     | 11     |
| $l_2,l_1$ | -,-  | -,7  | 6,9   | 6,9   | 7,11   |
| $l_3,l_2,l_1$ | -,-,- | -,-,7 | -,6,9 | 5,8,11 | 5,8,11 |

COEXISTENCE OF REFERENCE SIGNALS IN WIRELESS COMMUNICATION NETWORKS

RELATED APPLICATIONS

The present application claims the benefits of priority of U.S. Provisional Patent Application No. 62/738,434; entitled "COEXISTENCE OF REFERENCE SIGNALS IN WIRELESS COMMUNICATION NETWORKS"; and filed at the United States Patent and Trademark Office on Sep. 28, 2018; the content of which is incorporated herein by reference.

TECHNICAL FIELD

The present description generally relates to wireless communications and wireless communication networks, and more particularly relates to managing the coexistence of reference signals in wireless communication networks.

BACKGROUND

In wireless communication systems like LTE and NR, a reference signal (RS) is typically transmitted to aid radio channel knowledge and also, sometimes, for tracking impairments induced by a local oscillator of a transceiver. The design of a reference signal will depend on its use case and several types of reference signals are needed in a wireless communication system. The main purpose of a reference signal will often be reflected by its name, though this is not always the case.

For example, a reference signal designed and used for coherent demodulation of a physical layer channel is referred to as a demodulation reference signal (DMRS or DM-RS), a reference signal designed and used for acquiring channel state information in downlink is referred to as a channel state information reference signal (CSI-RS), and a reference signal designed for the tracking of time and frequency differences between transmitter and receiver is referred to as a tracking reference signal (TRS).

In LTE, a common reference signal (CRS) was specified and has multiple purposes including mobility and new cell detection. The CRS can therefore never be disabled; it must always be transmitted in an LTE cell, even if there are no users served.

Due to the wide range of use cases envisioned for NR, and also other factors, according to 3GPP agreements, each of the reference signals mentioned above is very configurable. They may occupy many different OFDM symbols within a slot of a radio frame and may also occupy different sets of subcarriers in each OFDM symbol.

NR DMRS

The NR DMRS can be configured with 1, 2, 3 or 4 DMRS symbols in a slot (where a slot has 14 OFDM symbols). The NR PDSCH can however be scheduled with duration shorter than 14 symbols. In such cases, the NR DMRS are moved closer to each other and are eventually dropped when the NR PDSCH duration is too short to accommodate the configured number of DMRS symbols.

An overview of NR DMRS positions can be seen in FIG. 1. Both single and double symbol DMRS are supported where double means that the DMRS symbols comes pairwise, using adjacent symbols. As can be seen in FIG. 1, as an example, if the NR PDSCH duration is 11 symbols and two additional DMRS symbols are configured, then they will be placed in symbol index 6 and 9, where symbol index number runs from 0 to 13. The position of the first symbol containing DMRS is either in the symbol with index 2 or 3 and is given by cell specific system information provided by the master information block (MIB).

LTE CRS

In LTE, the CRS positions in downlink subframes are dense and occupy resource elements symbol with slot indices 0, 4, 7, and 11 when 2 CRS ports are configured (denoted as LTE CRS ports 0 and 1). In case 4 CRS ports are configured, the CRS occupy symbols with slot indices 0, 1, 4, 7, 8, and 11. However, in the case with 4 ports being configured, the third and fourth ports (CRS ports 2 and 3) are only used when receiving PDSCH and not for mobility measurements as these measurements are defined on LTE ports 0 and 1 only.

NR LTE Coexistence

It is possible to operate an NR carrier and an LTE carrier in the same frequency band. The wireless devices connected to the LTE carrier are unaware that there is a potential NR transmission when there is no ongoing LTE transmission. The wireless devices connected to the NR carrier can, on the other hand, be configured to be aware of a potential overlap with an LTE carrier. Since the LTE CRS cannot be disabled, the slot will not be empty even if there is no LTE traffic. Hence, when LTE and NR use the same subcarrier spacing, i.e. 15 kHz, the NR radio network node (e.g., gNB, NG-RAN node, etc.) provides signaling of the positions of the CRS to the NR wireless device(s), using at least the RRC parameters lte-CRS-ToMatchAround for the CRS positions and nrofCRS-Ports for the number of CRS ports (1, 2 or 4). This allows coexistence of LTE and NR on the same carrier as NR PDSCH can be mapped around the LTE CRS.

SUMMARY

Though it is possible to operate an NR carrier and an LTE carrier in the same frequency band, a problem occurs when additional NR DMRS symbols are configured since for some NR PDSCH durations, at least some of the additional NR DMRS symbol(s) will be in the same symbol location as at least some of the LTE CRS symbol(s). This will corrupt the channel estimation for LTE or NR, depending on which reference signal the radio network node decides to puncture since it has to choose to transmit either the LTE CRS or the NR DMRS in the colliding resource elements.

According to one aspect, some embodiments include a method performed by a radio network node operating according to a first radio access technology and a second radio access technology. The method generally comprises transmitting a downlink transmission to a wireless device operating according to the first radio access technology, the downlink transmission comprising reference signals of the first radio access technology, wherein the reference signals of the first radio access technology are located at a first symbol location within the downlink transmission when the reference signals of the first radio access technology are determined not to collide with reference signals of the second radio access technology, and wherein the reference signals of the first radio access technology are located at a second symbol location within the downlink transmission when the reference signals of the first radio access technology are determined to collide with the reference signals of the second radio access technology.

In some embodiments, the method may comprise, or further comprise, transmitting an indication to the wireless device indicating that the first radio access technology and the second radio access technology are coexisting on a same carrier. In some embodiments, the indication may be transmitted in broadcast signaling or in dedicated signaling. In some embodiments, the indication may be transmitted in a System Information Block (SIB) message or in a Radio Resource Control (RRC) message. In some embodiments, the indication may be a parameter in an information element of the RRC message. In some embodiments, the parameter may be the lte-CRS-ToMatchAround parameter.

In some embodiments, the second symbol location may be before the first symbol location. In such embodiments, the second symbol location may be at least one symbol before the first symbol location.

In some embodiments, the second symbol location may be after the first symbol location. In such embodiments, the second symbol location may be at least one symbol after the first symbol location.

In some embodiments, the first radio access technology may be the New Radio (NR) radio access technology. In some embodiments, the second radio access technology may be the Long Term Evolution (LTE) radio access technology.

In some embodiments, the reference signals of the first radio access technology may be demodulation reference signals (DMRS). In some embodiments, the reference signals of the second radio access technology may be common or cell reference signals (CRS).

According to another aspect, some embodiments include a radio network node adapted, configured, enabled, or otherwise operable, to perform one or more of the described radio network node functionalities (e.g. actions, operations, steps, etc.).

In some embodiments, the radio network node may comprise one or more transceivers, one or more communication interfaces, and processing circuitry operatively connected to the one or more transceivers and to the one or more communication interfaces. The one or more transceivers are configured to enable the radio network node to communicate with one or more wireless devices over a radio interface. The one or more communication interfaces are configured to enable the radio network node to communicate with one or more other radio network nodes (e.g., via a radio access network communication interface), with one or more core network nodes (e.g., via a core network communication interface), and/or with one or more other network nodes. The processing circuitry is configured to enable the radio network node to perform one or more of the described radio network node functionalities. In some embodiments, the processing circuitry may comprise at least one processor and at least one memory, the memory storing instructions which, upon being executed by the processor, configure the at least one processor to enable the radio network node to perform one or more of the described radio network node functionalities.

In some embodiments, the radio network node may comprise one or more functional units (also referred to as modules) configured to perform one or more of the described radio network node functionalities. In some embodiments, these functional units may be embodied by the one or more transceivers and the processing circuitry of the radio network node.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the radio network node, they enable the radio network node to perform one or more of the described radio network node functionalities.

According to another aspect, some embodiments include a method performed by a wireless device operating according to a first radio access technology. The method generally comprises receiving a downlink transmission from a radio network node operating according to the first radio access technology and according to a second radio access technology, the downlink transmission comprising reference signals of the first radio access technology, wherein the reference signals of the first radio access technology are located at a first symbol location within the downlink transmission when the reference signals of the first radio access technology are determined not to collide with reference signals of the second radio access technology, and wherein the reference signals of the first radio access technology are located at a second symbol location within the downlink transmission when the reference signals of the first radio access technology are determined to collide with the reference signals of the second radio access technology.

In some embodiments, the method may comprise, or further comprise, receiving an indication from the radio network node indicating that the first radio access technology and the second radio access technology are coexisting on a same carrier. In some embodiments, the indication may be received in broadcast signaling or in dedicated signaling. In some embodiments, the indication may be received in a System Information Block (SIB) message or in a Radio Resource Control (RRC) message. In some embodiments, the indication may be a parameter in an information element of the RRC message. In some embodiments, the parameter may be the lte-CRS-ToMatchAround parameter.

In some embodiments, the second symbol location may be before the first symbol location. In such embodiments, the second symbol location may be at least one symbol before the first symbol location.

In some embodiments, the second symbol location may be after the first symbol location. In such embodiments, the second symbol location may be at least one symbol after the first symbol location.

In some embodiments, the first radio access technology may be the New Radio (NR) radio access technology. In some embodiments, the second radio access technology may be the Long Term Evolution (LTE) radio access technology.

In some embodiments, the reference signals of the first radio access technology may be demodulation reference signals (DMRS). In some embodiments, the reference signals of the second radio access technology may be common or cell reference signals (CRS).

According to another aspect, some embodiments include a wireless device adapted, configured, enabled, or otherwise operable, to perform one or more of the described wireless device functionalities (e.g. actions, operations, steps, etc.).

In some embodiments, the wireless device may comprise one or more transceivers and processing circuitry operatively connected to the one or more transceivers. The one or more transceivers are configured to enable the wireless device to communicate with one or more radio network nodes over a radio interface. The processing circuitry is configured to enable the wireless device to perform one or more of the described wireless device functionalities. In some embodiments, the processing circuitry may comprise at least one processor and at least one memory, the memory storing instructions which, upon being executed by the processor, enable the wireless device to perform one or more of the described wireless device functionalities.

In some embodiments, the wireless device may comprise one or more functional units (also referred to as modules) configured to perform one or more of the described wireless device functionalities. In some embodiments, these functional units may be embodied by the one or more transceivers and the processing circuitry of the wireless device.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the wireless device, they enable the wireless device to perform one or more of the described wireless device functionalities.

Hence, in some broad embodiments, the NR DMRS which are determined to collide with LTE CRS are moved away from the colliding symbol position(s) when LTE CRS are present. The presence of the LTE CRS may be signaled to the wireless device using a parameter such as, but not limited to, the lte-CRS-ToMatchAround parameter.

Some embodiments may thus enable an NR PDSCH to be transmitted in the whole slot (14 symbols), leading to increased average throughput and peak throughout of NR when operating in coexistence with LTE.

This summary is not an extensive overview of all contemplated embodiments, and is not intended to identify key or critical aspects or features of any embodiments or to delineate any embodiments. Other aspects and features will become apparent to those ordinarily skilled in the art upon review of the following description of specific embodiments with the figures.

BRIEF DESCRIPTION OF THE DRAWINGS

Exemplary embodiments will be described in more detail referring to the following figures, in which.

DETAILED DESCRIPTION

The embodiments set forth below represent information to enable those skilled in the art to practice the embodiments.

Upon reading the following description, given the accompanying figures, those skilled in the art will understand the concepts of the description and will recognize applications of these concepts not addressed herein. It should be understood these concepts and applications fall within the scope of the description.

In the following description, numerous specific details are set forth. However, it is understood that embodiments may be practiced without these specific details. In other instances, well-known circuits, structures, and techniques have not been shown in order not to obscure the understanding of the description. Those of ordinary skill in the art, with the included description, can implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" should include the plural forms, unless the context indicates otherwise. It will be further understood that the terms "comprises," "comprising," "includes," and/or "including" when used, specify the presence of stated features, integers, steps, operations, elements, and/or components, but do not preclude the presence or addition of one or more other features, integers, steps, operations, elements, components, and/or groups thereof.

Figure 1:
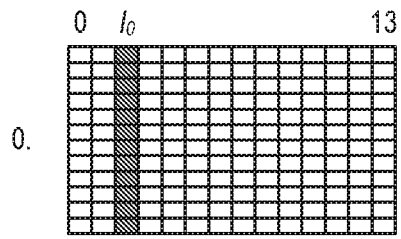
FIG. 1 is a schematic diagram of different single-symbol and double-symbol DMRS configurations in NR.
Figure 1:
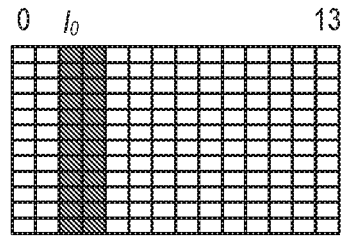
Figure 1:
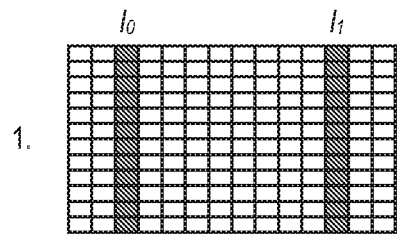
Figure 1:
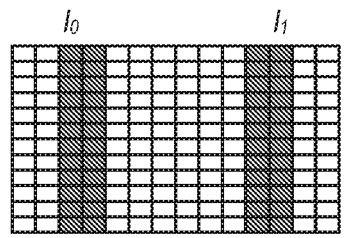
Figure 1:
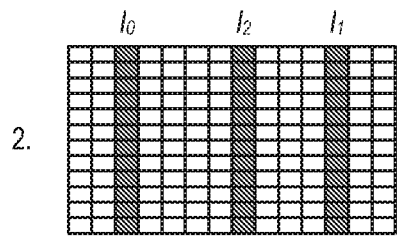
Figure 1:
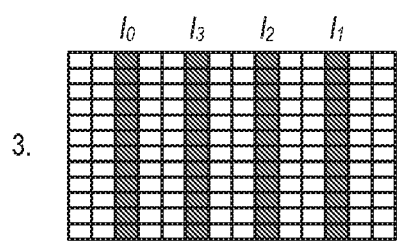
Figure 2:
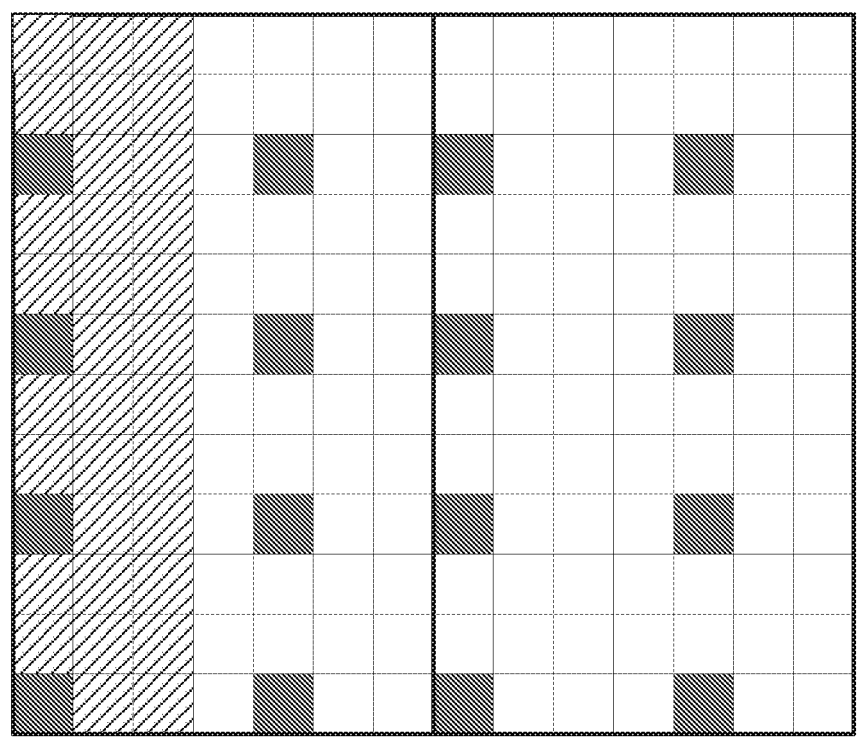
FIG. 2 is a schematic diagram of an example CRS configuration in LTE.
Figure 3:
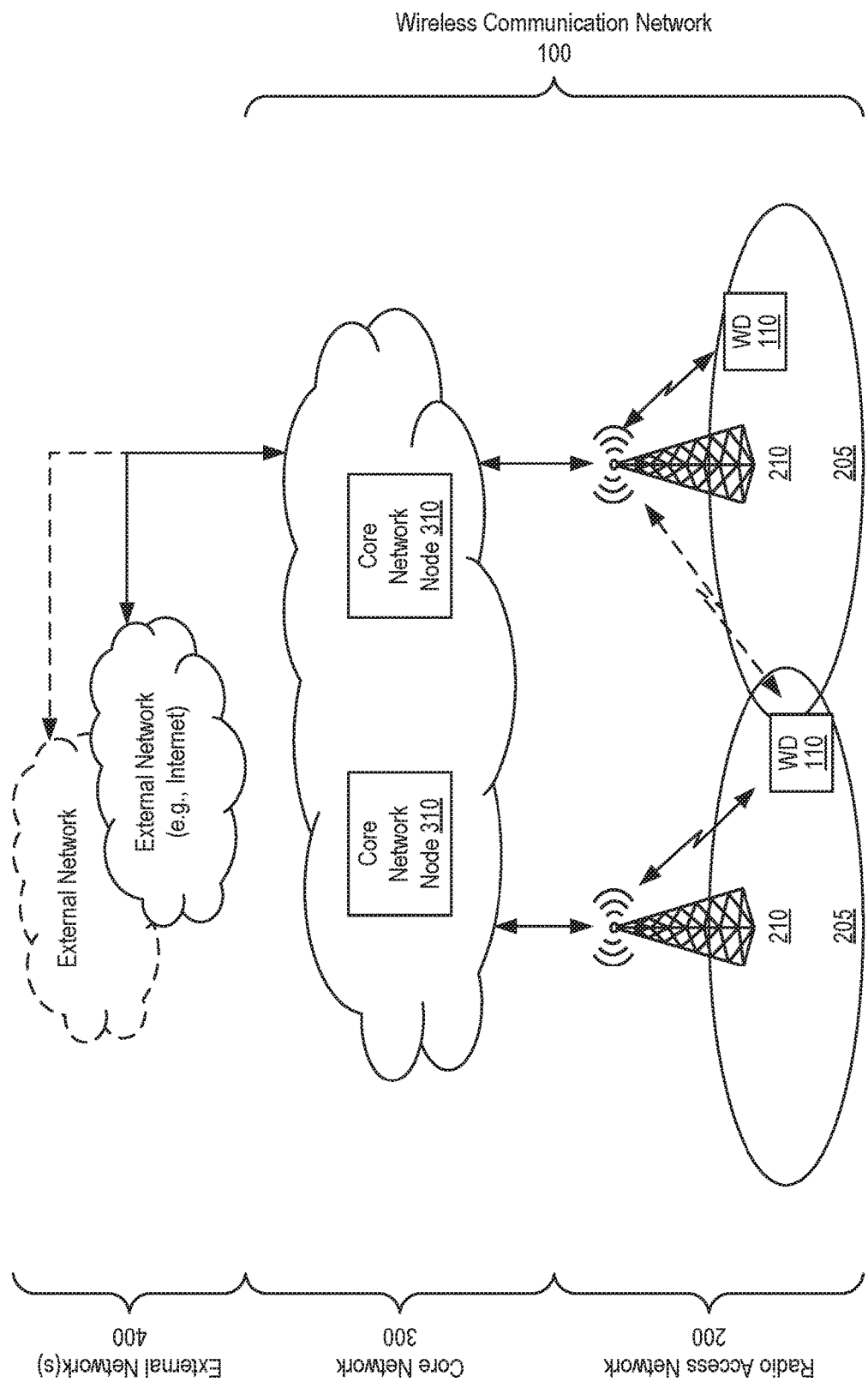
FIG. 3 is a schematic diagram of an example wireless communication network according to some embodiments.

Referring now to FIG. 3, an example of a wireless communication network 100 in which some embodiments may be deployed is depicted. The wireless communication network 100 generally enable wireless devices 110 to communicate with one or more external networks 400 via a radio access network 200 (also referred to a RAN) and a core network 300 (also referred to as CN).

The radio access network 200 generally comprises a plurality of radio network nodes 210 (only two are shown for clarity) which are responsible for providing radio access, over a radio interface, to wireless devices 110 (only two are shown for clarity) via one or more cells 205. Each cell 205 generally defines a geographical area associated to, and served by, a radio network node 210 where radio coverage is provided by the radio network node 210. Notably, one radio network node 210 may serve more than one cell 205, each of these cells 205 possibly covering different geographical areas.

The core network 300, which connects the radio access network 200 to one or more external networks 400, generally comprises various core network nodes 310. Though generally referred to as core network nodes 310, these core network nodes 310 have different functions. For instance, some core network nodes 310 may be responsible for managing the connectivity of the wireless devices 110 within the wireless communication network 100 while other core network nodes 310 may be responsible for handling the transmission of data between the wireless devices and the one or more external networks 400.

Figure 4:
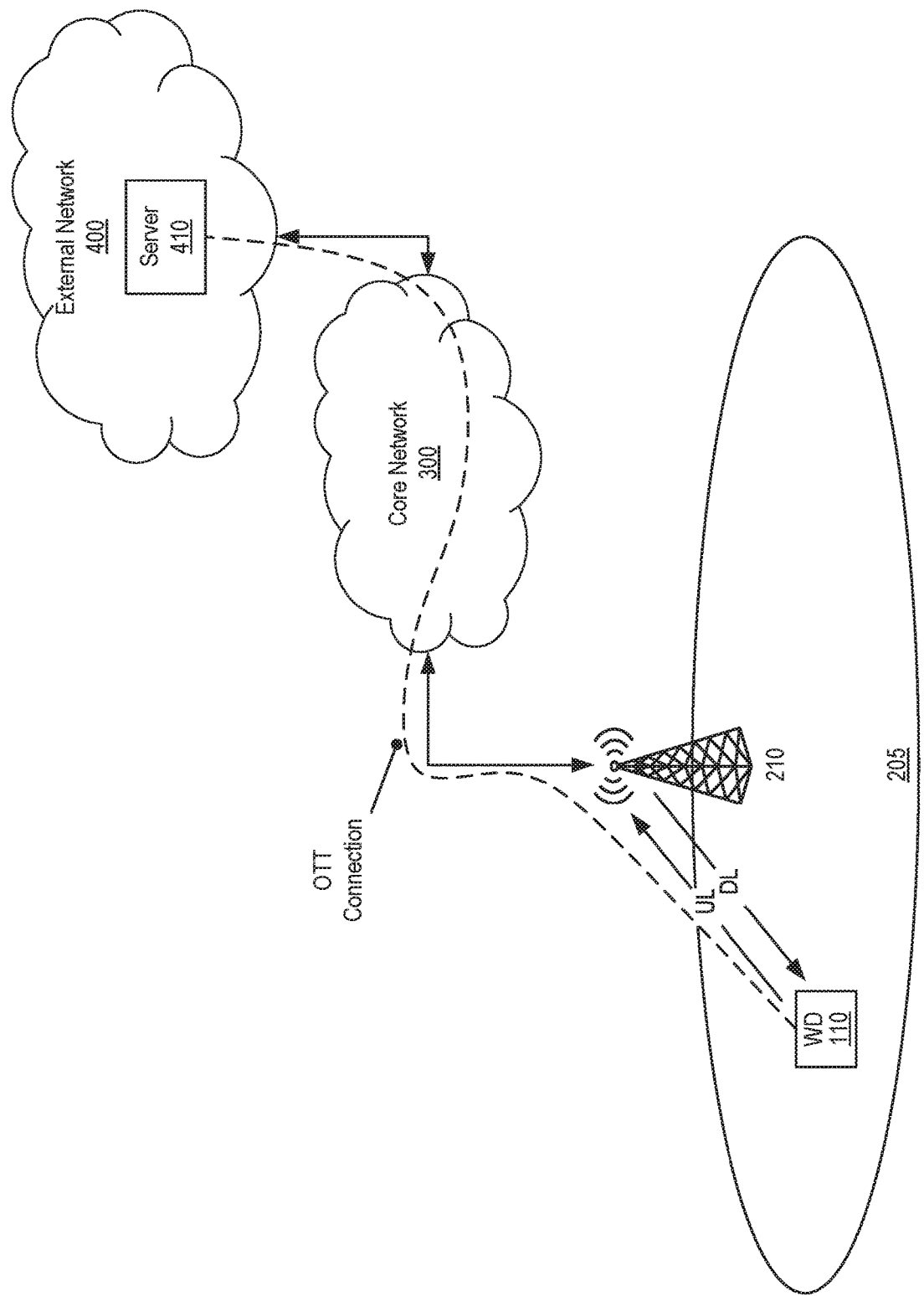
FIG. 4 is a schematic diagram of a portion of an example wireless communication network showing example signaling according to some embodiments.

Turning now to FIG. 4, additional details of the radio interface between a wireless device 110 and a radio network node 210 are shown. As illustrated, the radio interface generally enables the wireless device 110 and the radio network node 210 to exchange signals and messages in both a downlink direction, that is from the radio network node 210 to the wireless device 110, and in an uplink direction, that is from the wireless device 110 to the radio network node 210.

The radio interface between the wireless device 110 and the radio network node 210 typically enables the wireless device 110 to access various applications or services provided by the one or more external networks which may be provided by a server 410 (also referred to as a host computer). The connectivity between the wireless device 110 and the server 410, enabled at least in part by the radio interface between the wireless device 110 and the radio network node 210, may be described as an over-the-top (OTT) connection. In such cases, the wireless device 110 and the server 410 are configured to exchange data and/or signaling via the OTT connection, using the radio access network 200, the core network 300, and possibly one or more intermediate networks (e.g., a transport network) (not shown). The OTT connection may be transparent in the sense that the participating network nodes (e.g., the radio network node, one or more core network nodes, one or more transport network node, etc.) through which the OTT connection passes may be unaware of the actual OTT connection they enable and support. For example, the radio network node 210 may not or need not be informed about the previous handling (e.g., routing) of an incoming downlink communication with data originating from the server 410 to be forwarded or transmitted to the wireless device 110. Similarly, the radio network node 210 may not or need not be aware of the subsequent handling of an outgoing uplink communication originating from the wireless device 110 towards the server 410.

Broadly, when LTE and NR coexist on the same carrier (i.e., LTE and NR are operating in the same frequency band), the NR wireless device (also referred to as User Equipment or UE) can, if operating on 15 kHz subcarrier spacing, be informed about the position of the LTE CRS using the RRC parameter lte-CRS-ToMatchAround.

Figure 5:
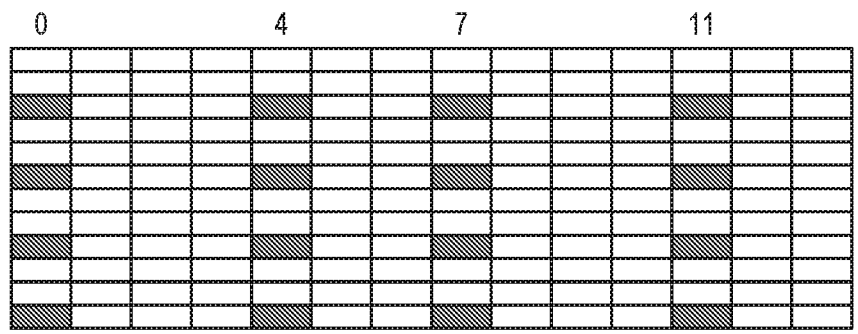
FIG. 5 is a schematic diagram of NR DMRS puncturing when LTE CRS are present.
Figure 5:
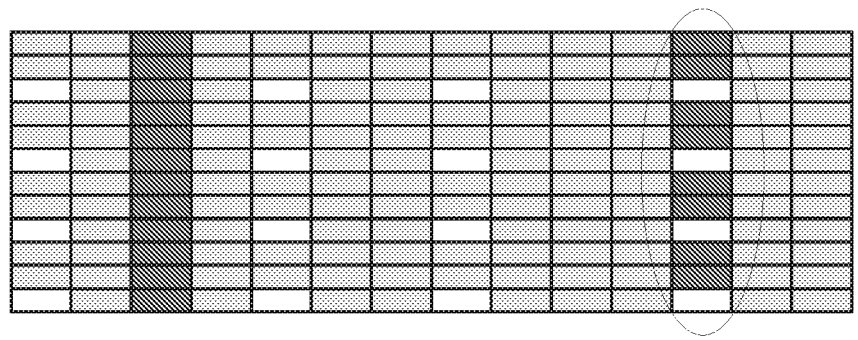

However, as can be seen in FIG. 5, when an additional NR DMRS is configured for the wireless device, the additional NR DMRS may collide with the LTE CRS, leading to degraded performance.

Figure 6:
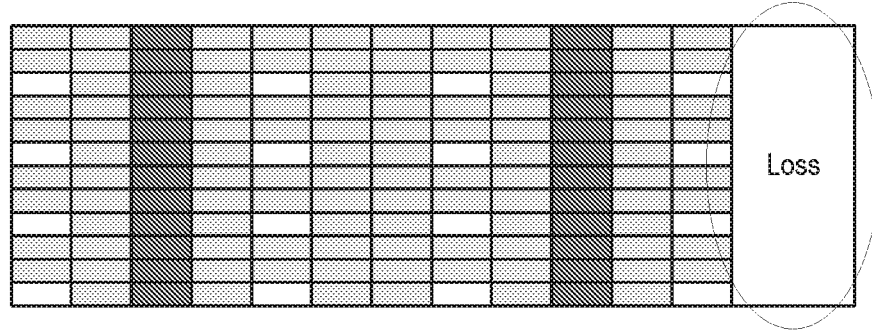
FIG. 6 is a schematic diagram of a possible solution when NR DMRS and LTE CRS are colliding.

One possible solution could be to schedule a shorter NR PDSCH, e.g., with a length of 12 or 11 OFDM symbols. In such cases, the additional NR DMRS would be at a symbol location which would not collide with the LTE CRS. However, as shown in FIG. 6, such a solution would imply a loss of about 15% in NR throughput compared to nominal since 2 out of 14 symbols would not be used, which may not be an acceptable solution in most cases.

For DCI format 1_0 and before RRC configuration, two additional DMRS symbols are used and these will also collide with LTE CRS. However, in these cases, which are rarely used, it could be acceptable to schedule a 12-symbol NR PDSCH. For high capacity data however, it would be detrimental to NR performance in such coexistence scenario to take the 15% overhead on top of the already present LTE CRS overhead.

Hence, in some embodiments, when LTE and NR coexist on the same carrier, the position of the (additional) NR DMRS is changed or otherwise shifted, based at least in part on the condition that the (additional) NR DMRS collide with the LTE CRS, and on the condition that the NR wireless device is made aware that LTE and NR coexist on the same carrier (e.g., on the condition that the NR wireless device is configured with LTE CRS for rate matching).

In the following example embodiments, the description is for a single-symbol NR DMRS with one additional NR DMRS. However, the description can readily be extended to cover two and three additional NR DMRS as well as double-symbol NR DMRS with one additional NR DMRS. In these cases, the colliding NR DMRS symbols are moved to a nearby symbol position where they do not collide with LTE CRS.

Furthermore, there are different locations where the colliding NR DMRS can be moved to. For example, in some embodiments, the colliding NR DMRS can be moved backward (or before) the colliding symbol location, e.g., from symbol index 11 to symbol index 10 (i.e., to symbol index $l_1=10$). In some other embodiments, the colliding NR DMRS can be moved forward (or after) the colliding symbol location, e.g., from symbol index 11 to symbol index 12 (i.e., to symbol index $l_1=12$). A possible advantage of moving the colliding DMRS forward to $l_1=12$ is reduced extrapolation of the radio channel.

In some embodiments, if at least one of the NR DMRS symbols collide with LTE CRS, then all NR DMRS symbols are shifted by the same number of symbols (e.g., n=2) either forward or backward, to a position where none of the NR DMRS collides with LTE CRS.

One embodiment is described as follows:

For PDSCH mapping Type A, when lte-CRS-ToMatchAround is configured and dmrs-AdditionalPosition='pos1', and single-symbol DMRS, then the DM-RS positions for PDSCH duration of 13 and 14 symbols are $l_0$, 12 instead of the default $l_0$, 11.

Figure 7:
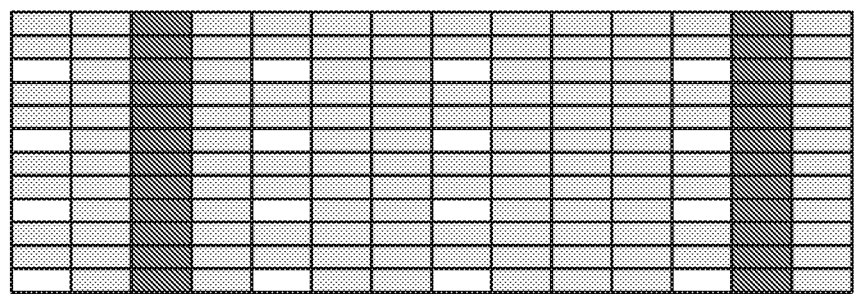
FIG. 7 is a schematic diagram of NR DMRS being moved away from LTE CRS when NR DMRS and LTE CRS are colliding according to some embodiments.

Hence, the NR DMRS is moved one symbol forward (i.e., after the colliding symbol location) as shown in FIG. 7.

In some embodiments, the following section of 3GPP TS 38.211 V15.2.0 may be modified as follows to enable one or more of the described embodiments.

======<<<<<<3GPP TS 38.211>>>>>>======

7.4.1.1.2 Mapping to physical resources

[unchanged section(s) omitted]

The position(s) of the DM-RS symbols is given by $\bar{l}$ and for PDSCH mapping type A, the duration is between the first OFDM symbol of the slot and the last OFDM symbol of the scheduled PDSCH resources in the slot for PDSCH mapping type B, the duration is the number of OFDM symbols of the scheduled PDSCH resources as signalled and according to Tables 7.4.1.1.2-3 and 7.4.1.1.2-4. The case dmrs-AdditionalPosition equal to 3 is only supported when dmrs-TypeA-Position is equal to 2. For PDSCH mapping type A, duration of 3 and 4 symbols in Tables 7.4.1.1.2-3 and 7.4.1.1.2-4 respectively is only applicable for dmrs-TypeA-Position equals 2. The value $l_1$ equals 12 if the higher layer parameter lte-CRS-ToMatchAround is configured and 11 otherwise.

[unchanged sections omitted]

TABLE 7.4.1.1.2-3

PDSCH DM-RS positions $\bar{l}$ for single-symbol DM-RS.

| Duration in symbols | PDSCH mapping type A dmrs-AdditionalPosition | | | | PDSCH mapping type B dmrs-AdditionalPosition | | | |
|---|---|---|---|---|---|---|---|---|
| | 0 | 1 | 2 | 3 | 0 | 1 | 2 | 3 |
| 2 | — | — | — | — | $l_0$ | $l_0$ | | |
| 3 | $l_0$ | $l_0$ | $l_0$ | $l_0$ | — | — | | |
| 4 | $l_0$ | $l_0$ | $l_0$ | $l_0$ | $l_0$ | $l_0$ | | |
| 5 | $l_0$ | $l_0$ | $l_0$ | $l_0$ | — | — | | |
| 6 | $l_0$ | $l_0$ | $l_0$ | $l_0$ | $l_0$ | $l_0$, 4 | | |
| 7 | $l_0$ | $l_0$ | $l_0$ | $l_0$ | $l_0$ | $l_0$, 4 | | |
| 8 | $l_0$ | $l_0$, 7 | $l_0$, 7 | $l_0$, 7 | — | — | | |
| 9 | $l_0$ | $l_0$, 7 | $l_0$, 7 | $l_0$, 7 | — | — | | |
| 10 | $l_0$ | $l_0$, 9 | $l_0$, 6, 9 | $l_0$, 6, 9 | — | — | | |
| 11 | $l_0$ | $l_0$, 9 | $l_0$, 6, 9 | $l_0$, 6, 9 | — | — | | |
| 12 | $l_0$ | $l_0$, 9 | $l_0$, 6, 9 | $l_0$, 5, 8, 11 | — | — | | |
| 13 | $l_0$ | $l_0$, $l_1$ | $l_0$, 7, 11 | $l_0$, 5, 8, 11 | — | — | | |
| 14 | $l_0$ | $l_0$, $l_1$ | $l_0$, 7, 11 | $l_0$, 5, 8, 11 | — | — | | |

[unchanged sections omitted]
=======<<<<<<3GPP TS 38.211>>>>>=======

Figure 8:
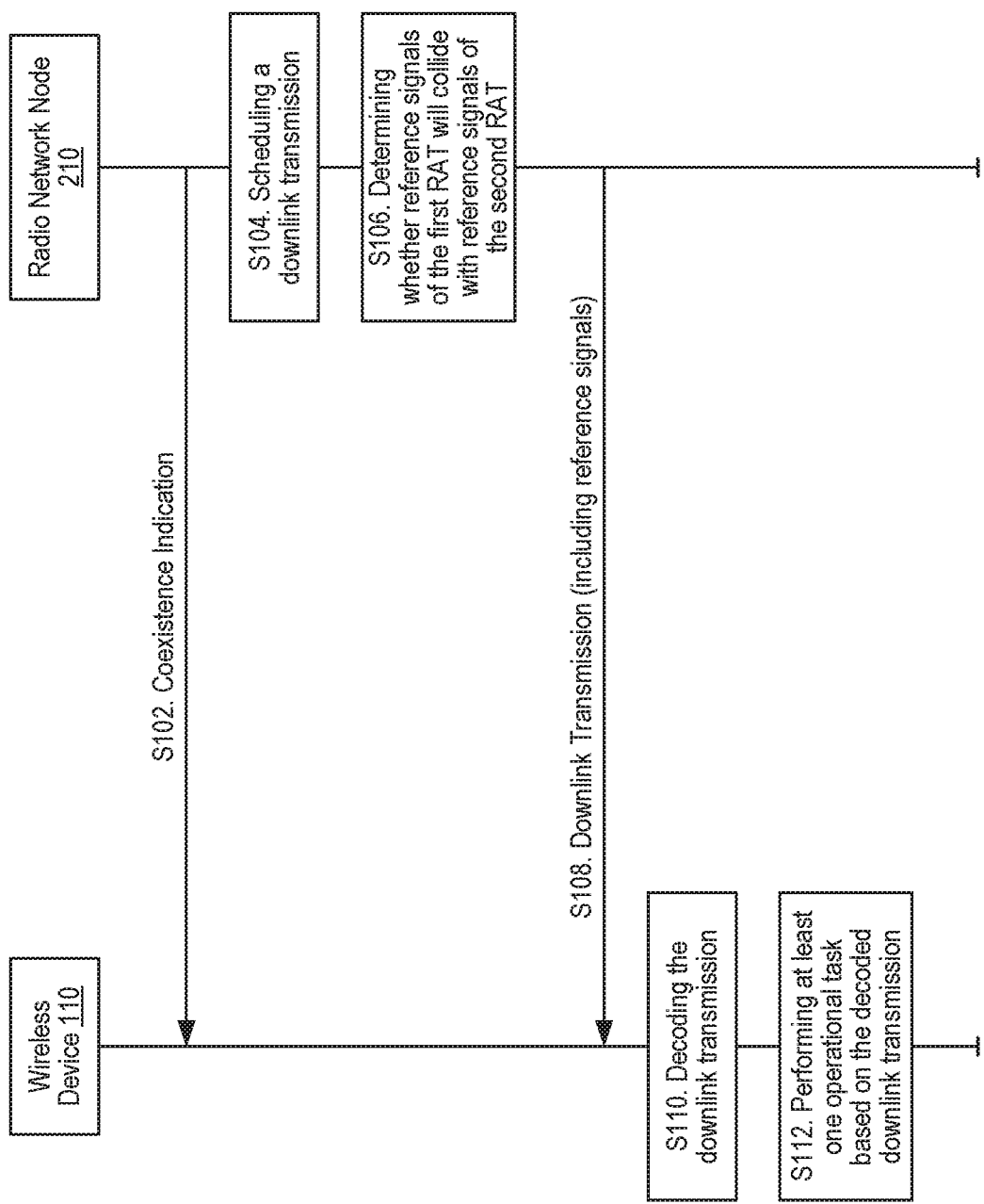
FIG. 8 is a signaling diagram according to some embodiments.

Referring to FIG. 8, a high-level signaling and operating diagram according to some embodiments is illustrated. The radio network node 210, which is configured to operate according to both a first radio access technology (RAT) (e.g., NR) and a second RAT (e.g., LTE), transmits an indication to the wireless device 110, which is configured to operate according to the first RAT (e.g., NR), that the two RATs are coexisting on the same carrier (and usually that the radio network node 210 operates according to both RATs) (action S102).

The radio network node 210 may transmit the indication of coexistence of the two RATs (i.e., the coexistence indication) to the wireless device 110 in different ways. For instance, in some embodiments, the radio network node 210 may transmit the coexistence indication via broadcast signaling (e.g., via a System Information Block (SIB) message) or via a dedicated signaling (e.g., via a Radio Resource Control (RRC) message). In some other embodiments, the coexistence indication may be an existing parameter reused for that purpose (e.g., a parameter in an Information Element of an RRC message such as the lte-CRS-ToMatchAround parameter) or a new parameter designed for that purpose.

After receiving the coexistence indication, the wireless device 110 will be aware that the radio network node 210 may perform downlink transmissions according to both RATs (e.g., according to both NR and LTE). Though the wireless device 110 may not need to monitor and decode the downlink transmissions transmitted according to the second RAT, the wireless device 110 may still have to consider the second RAT transmissions when monitoring and receiving the first RAT transmissions. For instance, the wireless device 110 may need to rate match around some of the reference signals sent according to the second RAT (e.g., the LTE CRS) when receiving a downlink transmission according to the first RAT.

At some point in time, the radio network node 210 may need to schedule a downlink transmission to the wireless device 110, for instance, to transmit some data (action S104). Using NR as an example, to transmit data to the wireless device 110, the radio network node 210 will typically allocate resource for a downlink control channel carrying control information (e.g., an NR PDCCH) and for an associated downlink shared channel carrying the data addressed to the wireless device 110 (e.g., an NR PDSCH). To enable the proper demodulation of the transmitted downlink shared channel, demodulation reference signals (DMRS) will be included at one or more symbol locations within the downlink shared channel depending on the length or duration of the downlink shared channel and possibly on other parameters. In NR, the symbol locations of the DMRS are specified in section 7.4.1.1.2 of 3GPP TS 38.211 V15.2.0.

Depending on the configuration of the reference signals of the first RAT (e.g., NR PDSCH DMRS), it is possible, as indicated above, that (at least some of) the reference signals of the first RAT would collide (i.e., be located at the same symbol location) with reference signals of the second RAT (e.g., LTE CRS). To avoid collision between the reference signals of the two RATs, the radio network node 210 may check or otherwise determine whether the reference signals of the first RAT will collide with reference signals of the second RAT. If no collision is determined to be occurring between the reference signals of the two RATs, then the radio network node 210 will transmit the downlink transmission (e.g., NR PDCCH and NR PDSCH) with the reference signals of the first RAT at a first (or nominal) symbol location (action S108). Otherwise, if collision is determined to be occurring between the reference signals of the two RATs, the radio network node 210 will transmit the downlink transmission (e.g., NR PDCCH and NR PDSCH) with the reference signals of the first RAT at a second (or different) symbol location (action S108).

It will be appreciated that if the downlink transmission comprises reference signals of the first RAT at multiple symbol locations, for instance as shown in FIG. 5 where the DMRS are located at both symbol index 2 and 11, it is possible to only change the symbol location of the reference signals of the first RAT which are determined to be colliding with reference signals of the second RAT. In FIG. 5, only the NR DMRS located at symbol index 11 are determined to be colliding. In such cases, only the reference signals of the first RAT determined to be colliding with reference signals of the second RAT can be moved or shifted to a different symbol location to avoid collision as shown in FIG. 7. In other embodiments however, all the reference signals of the first RAT may be moved to symbol locations which are not colliding with reference signals of the second RAT event if only one reference signal of the first RAT is colliding with reference signals of the second RAT.

Once the wireless device 110 receives the downlink transmission, it will decode it knowing that the position of at least some reference signals of the first RAT may be at different symbol locations (action S110). Depending on the content of the downlink transmission, the wireless device 110 may perform one or more operational tasks associated with the content of the downlink transmission (action S112).

It is to be noted that unless the description clearly indicates a certain relationship (e.g., causal, conditional, temporal, etc.) between two or more actions, the described actions may be performed in a different sequence than the one illustrated. For example, two actions shown performed in succession may be performed substantially concurrently, or even in the reverse order. Hence, the illustrated sequence of actions is only indicative of one particular sequence of actions and does not suggest that this is the only possible sequence.

Figure 9:
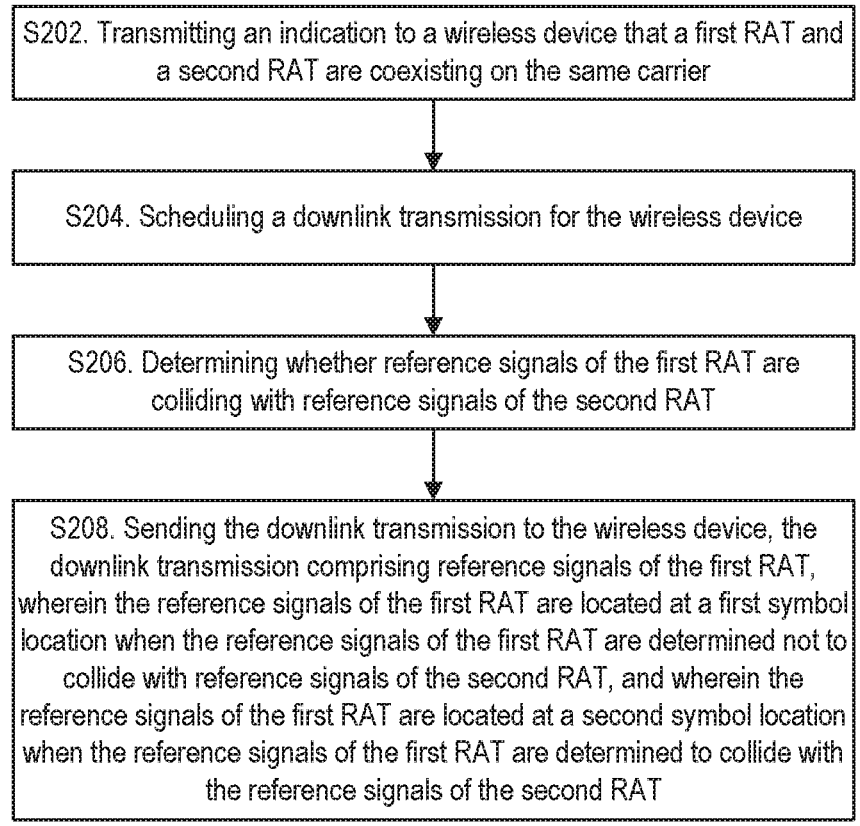
FIG. 9 is a flow chart of operations of a radio network node according to some embodiments.

FIG. 9 is a flow chart illustrating operations of the radio network node 210 according to some embodiments. As illustrated, the radio network node 210 transmits an indication to a wireless device 110 (which may operate according to a first RAT (e.g., NR)) that the first RAT and a second RAT (e.g., LTE) are coexisting on the same carrier (action S202). As previously mentioned, the radio network node 210 may transmit this coexistence indication to the wireless device 110 in broadcast signaling (e.g., via a SIB message) or in dedicated signaling (e.g., via an RRC message). As also previously indicated, the coexistence indication may be an existing parameter (e.g., the lte-CRS-ToMatchAround parameter) reused for that purpose or a new parameter designed for that purpose.

The radio network node 210 may then schedule a downlink transmission for the wireless device 110, for instance, to transmit some data (action S204). Using again NR as an example, to transmit data to the wireless device 110, the radio network node 210 will typically allocate resource for a downlink control channel carrying control information (e.g., an NR PDCCH) and for an associated downlink shared channel carrying the data addressed to the wireless device 110 (e.g., an NR PDSCH). To enable the proper demodulation of the transmitted downlink shared channel, demodulation reference signals (DMRS) will be included at one or more symbol locations within the downlink shared channel depending on the length or duration of the downlink shared channel and possibly on other parameters. In NR, the symbol locations of the DMRS are specified in section 7.4.1.1.2 of 3GPP TS 38.211 V15.2.0.

Depending on the configuration of the reference signals of the first RAT (e.g., NR PDSCH DMRS), it is possible, as indicated above, that (at least some of) the reference signals of the first RAT would collide (i.e., be located at the same symbol location) with reference signals of the second RAT (e.g., LTE CRS). To avoid collision between the reference signals of the two RATs, the radio network node 210 may check or otherwise determine whether the reference signals of the first RAT will collide with reference signals of the second RAT (action S206). If no collision is determined to be occurring between the reference signals of the two RATs, then the radio network node 210 will transmit the downlink transmission (e.g., NR PDCCH and NR PDSCH) with the reference signals of the first RAT at a first (or nominal) symbol location (action S208). Otherwise, if collision is determined to be occurring between the reference signals of the two RATs, the radio network node 210 will transmit the downlink transmission (e.g., NR PDCCH and NR PDSCH) with the reference signals of the first RAT at a second (or different) symbol location (action S208).

It is to be noted that unless the description clearly indicates a certain relationship (e.g., causal, conditional, temporal, etc.) between two or more actions, the described actions may be performed in a different sequence than the one illustrated. For example, two actions shown performed in succession may be performed substantially concurrently, or even in the reverse order. Hence, the illustrated sequence of actions is only indicative of one particular sequence of actions and does not suggest that this is the only possible sequence.

Figure 10:
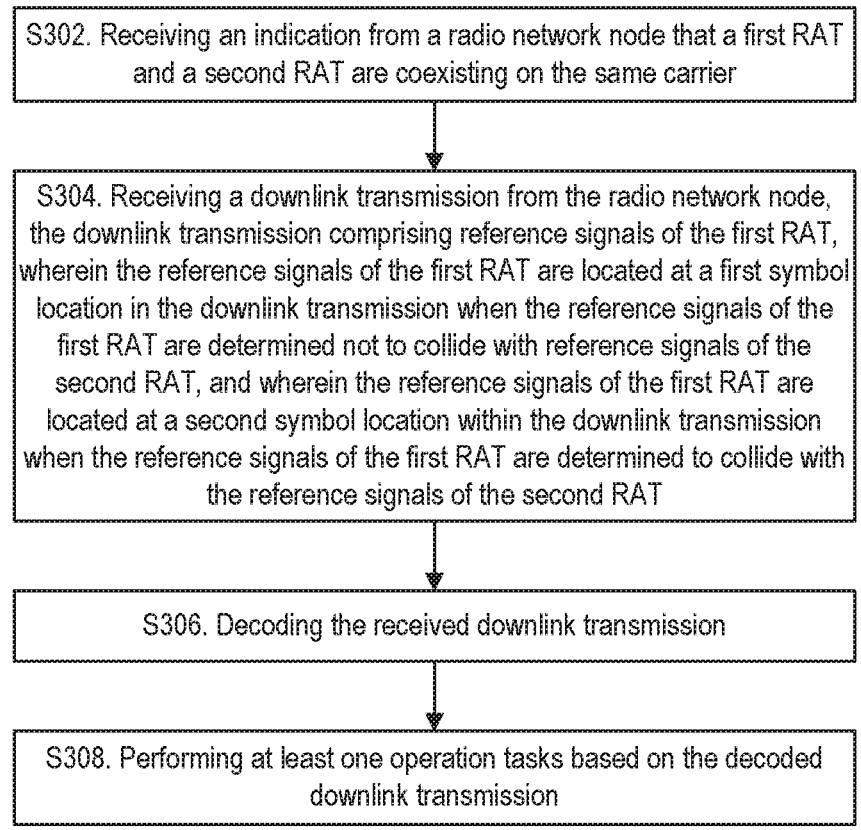
FIG. 10 is a flow chart of operations of a wireless device according to some embodiments.

FIG. 10 is a flow chart illustrating operations of the wireless device 110 according to some embodiments. As illustrated, the wireless device 110 (which may operate according to a first RAT (e.g., NR)) may receive, from a radio network node 210, an indication that the first RAT and a second RAT (e.g., LTE) are coexisting on the same carrier (action S302). As previously mentioned, the wireless device 110 may receive this coexistence indication in broadcast signaling (e.g., via a SIB message) or in dedicated signaling (e.g., via an RRC message). As also previously mentioned, the indication may be an existing parameter (e.g., the lte-CRS-ToMatchAround parameter) reused for that purpose or a new parameter designed for that purpose.

At some point in time, the wireless device 110 may receive a downlink transmission from the radio network node 210. The downlink transmission comprises reference signals of the first RAT which are located at a first symbol location within the downlink transmission when the reference signals of the first RAT are determined not to collide with reference signals of the second RAT, and which are located at a second symbol location within the downlink transmission when the reference signals of the first RAT are determined to collide with the reference signals of the second RAT (action S304).

Upon received the downlink transmission from the radio network node 210, the wireless device 110 will decode it (action S306) and generally perform at least one operational task based on the decoded downlink transmission (action S308).

Embodiments of a radio network node 210 will now be described in view of FIGS. 11 and 12. Even though the expression radio network node is used throughout the description, it is to be understood that the expression is used generically. A radio network node generally refers to an equipment, or a combination of equipments, arranged, capable, configured, and/or operable to communicate directly or indirectly with a wireless device and/or with other network nodes (e.g., radio network nodes, core network nodes, etc.) in the wireless communication network to enable and/or provide wireless access to the wireless device and/or to perform other functions (e.g., administration) in the wireless communication network.

Notably, different communication standards may use different terminology when referring to or describing radio network node. For instance, 3GPP uses the terms Node B (NB), evolved Node B (eNB), next-generation Node B (gNB), Next-Generation Radio Access Node (NG-RAN node), Radio Network Controller (RNC), and Base Station (BS). 3GPP2 uses the terms Access Node (AN), Base Station (BS), and Base Station Controller (BSC). And IEEE 802.11 (also known as WiFi™) uses the access point (AP). Understandably, the generic expression radio network node encompasses these terms.

Figure 11:
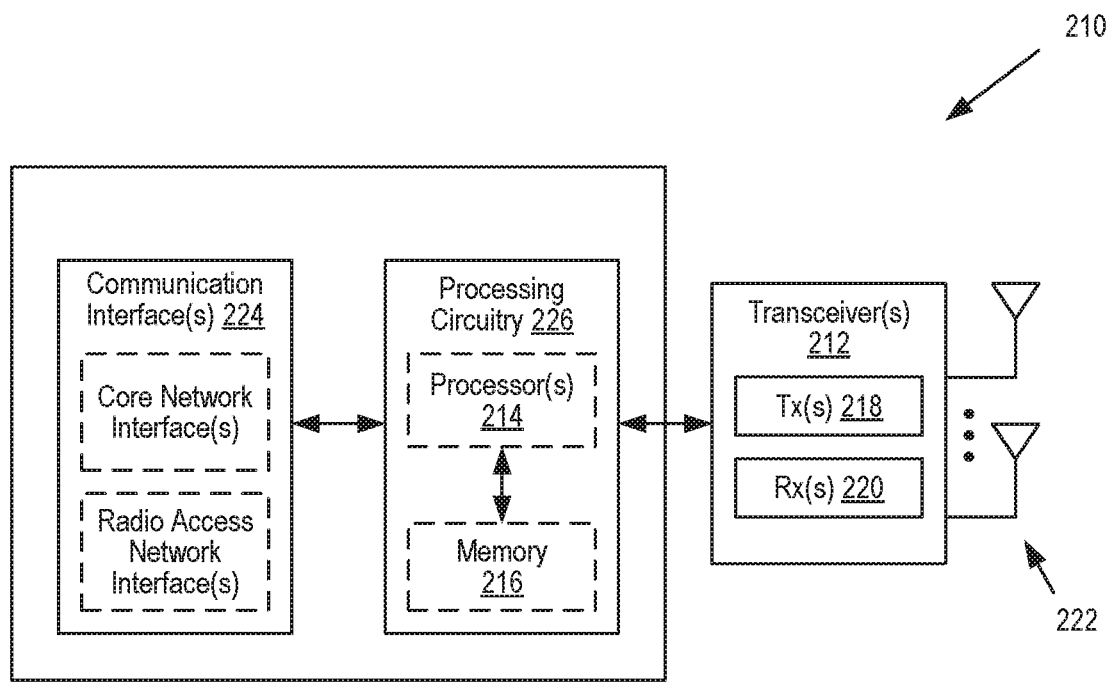
FIG. 11 is a block diagram of a radio network node according to some embodiments.

FIG. 11 is a block diagram of an exemplary radio network node 210 according to some embodiments. As illustrated, radio network node 210 may include one or more of a transceiver 212, processor 214, memory 216, and communication interface(s) 224. The transceiver 212 enables the radio network node 210 to transmit wireless signals to and receiving wireless signals from wireless device 110 (e.g., via transmitter(s) (Tx) 218, receiver(s) (Rx) 220, and antenna(s) 222). The processor 214 executes instructions to provide some or all of the functionalities described as being provided by the radio network node 210. The memory 216 stores the instructions to be executed by the processor 214 and may also store data during operation of the radio network node 210. In some embodiments, the processor 214 and the memory 216 may form processing circuitry 226. The communication interface(s) 224 enable the radio network 210 to communicate with other network nodes, including other radio network nodes 210 (via a radio access network interface) and core network nodes 310 (via a core network interface).

The processor 214 may include any suitable combination of hardware to execute instructions and manipulate data to perform some or all of the described functions of radio network node 210, such as those described above. In some embodiments, the processor 214 may include, for example, one or more computers, one or more central processing units (CPUs), one or more microprocessors, one or more application specific integrated circuits (ASICs), one or more field programmable gate arrays (FPGAs) and/or other logic.

The memory 216 is generally operable to store instructions, such as a computer program, software, an application including one or more of logic, rules, algorithms, code, tables, etc. and/or other instructions capable of being executed by a processor 214. Examples of memory 216 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 214 of radio network node 210.

In some embodiments, the communication interface 224 is communicatively coupled to the processor 214 and may refer to any suitable device operable to receive input for radio network node 210, send output from radio network node 210, perform suitable processing of the input or output or both, communicate to other devices, or any combination of the preceding. The communication interface may include appropriate hardware (e.g., port, modem, network interface card, etc.) and software, including protocol conversion and data processing capabilities, to communicate through a network.

Other embodiments of radio network node 210 may include additional components beyond those shown in FIG. 11 that may provide certain aspects of the radio network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 12:
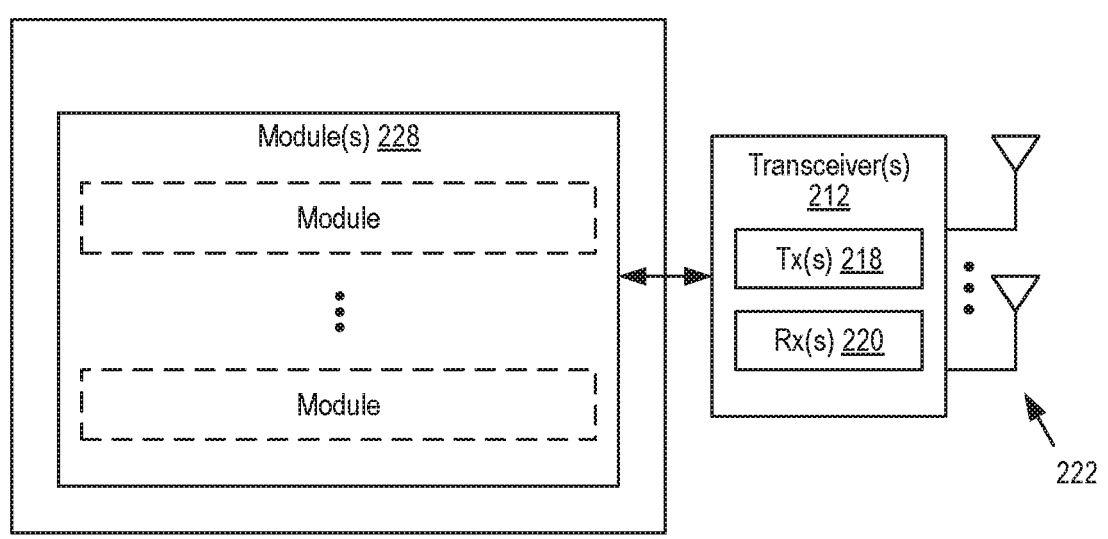
FIG. 12 is another block diagram of a radio network node according to some embodiments.

FIG. 12 is a block diagram of another exemplary radio network node 210 according to some embodiments. As illustrated, in some embodiments, the radio network node 210 may comprise modules (or units) 228 configured to implement some or all of the functionalities of the radio network node 210 described above. It will be appreciated that the modules 228 may be implemented as combination of hardware and/or software, for instance, the processor 214, memory 216, and transceiver(s) 212 of radio network node 210 in FIG. 11. Some embodiments may also include additional modules 228 to support additional and/or optional functionalities.

Some embodiments of a wireless device (WD) 110 will now be described in view of FIGS. 13 and 14. Even though the expression wireless device is used throughout the description, it is to be understood that the expression is used generically. A wireless device generally refers to a device arranged, capable, configured, and/or operable to communicate wirelessly with one or more network nodes (e.g., radio network nodes) and/or with one or more other wireless devices. In some embodiments, a wireless device may be configured to transmit and/or receive information without direct human interaction. Such a wireless device may be called a Machine Type Communication (MTC) device or as a Machine-to-Machine (M2M) device.

Notably, different communication standards may use different terminology when referring to or describing wireless device. For instance, 3GPP uses the terms User Equipment (UE), Mobile Equipment (ME) and Mobile Terminal (MT). 3GPP2 uses the terms Access Terminal (AT) and Mobile Station (MS). And IEEE 802.11 (also known as WiFi™) uses the term station (STA). Understandably, the generic expression wireless device encompasses these terms.

Figure 13:
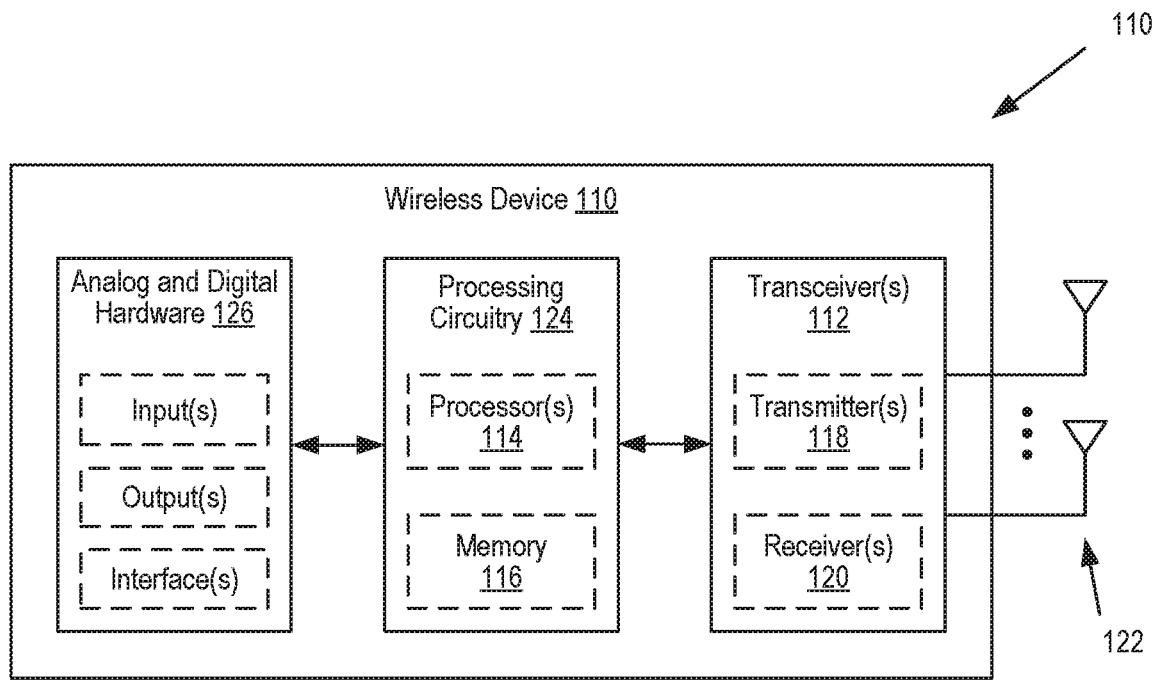
FIG. 13 is a block diagram of a wireless device according to some embodiments.

FIG. 13 is a block diagram of an exemplary wireless device 110 according to some embodiments. Wireless device 110 includes one or more of a transceiver 112, processor 114, and memory 116. In some embodiments, the transceiver 112 facilitates transmitting wireless signals to and receiving wireless signals from radio network node 210 (e.g., via transmitter(s) (Tx) 118, receiver(s) (Rx) 120, and antenna(s) 122). The processor 114 executes instructions to provide some or all of the functionalities described above as being provided by wireless device 110, and the memory 116 stores the instructions to be executed by the processor 114 and may also store data during operation of the wireless device 110. In some embodiments, the processor 114 and the memory 116 form processing circuitry 124.

The processor 114 may include any suitable combination of hardware to execute instructions and manipulate data to perform some or all of the described functions of wireless device 110, such as the functions of wireless device 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of wireless device 110.

Other embodiments of wireless device 110 may include additional components beyond those shown in FIG. 13 that may be responsible for providing certain aspects of the wireless device's functionalities, including any of the functionalities described above and/or any additional functionalities (including any functionality necessary to support the solution described above). As just one example, wireless device 110 may include input devices and circuits, output devices, and one or more synchronization units or circuits, which may be part of the processor. Input devices include mechanisms for entry of data into wireless device 110. As an example, wireless device 110 may include additional hardware 126 such as input devices and output devices. Input devices include input mechanisms such as microphone, input elements, display, etc. Output devices include mechanisms for outputting data in audio, video and/or hard copy format. For example, output devices may include a speaker, a display, etc.

Figure 14:
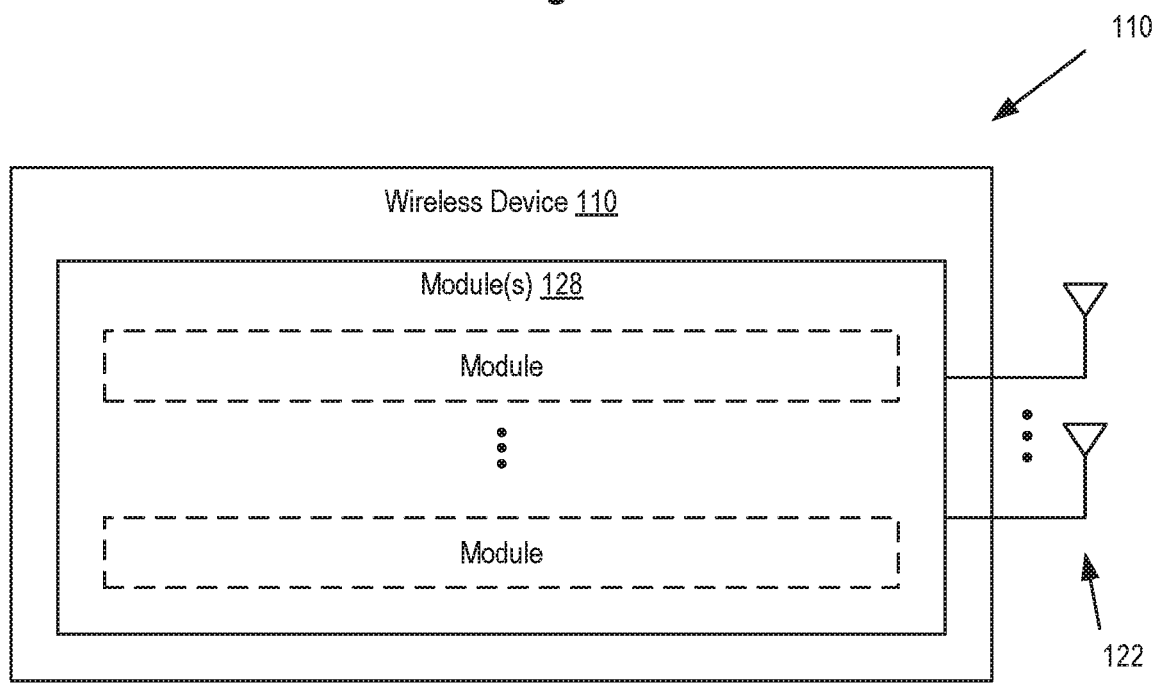
FIG. 14 is another block diagram of a wireless device according to some embodiments.

FIG. 14 is a block diagram of another exemplary wireless device 110 according to some embodiments. As illustrated, in some embodiments, the wireless device 110 may comprise modules (or units) 128 configured to implement some or all of the functionalities of the wireless device 110 described above. It will be appreciated that the modules 128 may be implemented as combination of hardware and/or software, for instance, the processor 114, memory 116, and transceiver(s) 112 of wireless device 110 in FIG. 13. Some embodiments may also include additional modules 128 to support additional and/or optional functionalities.

Some embodiments may be represented as a non-transitory software product stored in a machine-readable medium (also called a computer-readable medium, a processor-readable medium, or a computer usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are examples only. Alterations, modifications and variations may be effected to the particular embodiments by those of skill in the art without departing from the scope of the description.

ABBREVIATIONS AND ACRONYMS

The present description may comprise these abbreviations and/or acronyms:
- 3GPP Third Generation Partnership Project
- AMF Access Management Function
- CN Core Network
- CRS Common Reference Signal
- CSI-RS Channel State Information Reference Signal
- D2D Device-to-Device
- DCI Downlink Control Information
- DMRS DeModulation Reference Signal
- eNB evolved Node B
- EPC Evolved Packet Core
- E-UTRAN Evolved Universal Terrestrial Radio Access Network
- GGSN Gateway GPRS Support Node
- gNB Next Generation Node B (a Node B supporting NR)
- LTE Long Term Evolution
- MME Mobility Management Entity
- NB Node B
- NGC Next Generation Core
- NG-RAN Next-Generation Radio Access Network
- NR New Radio
- OFDM Orthogonal Frequency Division Multiplexing
- PDSCH Physical Downlink Shared CHannel
- PGW Packet Data Network Gateway
- RAN Radio Access Network
- RNC Radio Network Controller
- RS Reference Signal
- TRS Tracking Reference Signal
- UE User Equipment

RELATED STANDARD REFERENCES

The following references may be related to the present description:
- 3GPP TS 38.211 V15.2.0
- 3GPP TS 38.214 V15.2.0
- 3GPP TS 38.331 V15.2.1

What is claimed is:

1. A method in a radio network node, the radio network node operating according to a first radio access technology and a second radio access technology, the first and second radio access technologies using a same subcarrier spacing, the method comprising:
   transmitting an indication to a wireless device indicating that the first radio access technology and the second radio access technology are coexisting on a same carrier, the indication being a parameter in an information element of a Radio Resource Control, RRC, message;
   transmitting a downlink transmission to the wireless device operating according to the first radio access technology, the downlink transmission including reference signals of the first radio access technology, the reference signals of the first radio access technology being located at a first symbol location within the downlink transmission when the reference signals of the first radio access technology are determined not to collide with reference signals of the second radio access technology, and the reference signals of the first radio access technology being located at a second symbol location within the downlink transmission when the reference signals of the first radio access technology are determined to collide with the reference signals of the second radio access technology, the second symbol location being either before the first symbol location or after the first symbol location.

2. The method of claim 1, wherein the parameter is a lte-CRS-ToMatchAround parameter.

3. The method of claim 1, wherein the second symbol location is either at least one symbol before the first symbol location or at least one symbol after the first symbol location.

4. The method of claim 1, wherein the reference signals of the first radio access technology are demodulation reference signals, DMRS.

5. The method of claim 1, wherein the reference signals of the second radio access technology are common or cell reference signals, CRS.

6. A radio network node configured to operate according to a first radio access technology and a second radio access technology, the first and second radio access technologies using a same subcarrier spacing, the radio network node adapted to:
   transmit an indication to a wireless device indicating that the first radio access technology and the second radio access technology are coexisting on a same carrier, the indication being a parameter in an information element of a Radio Resource Control, RRC, message:
   transmit a downlink transmission to the wireless device operating according to the first radio access technology, the downlink transmission including reference signals of the first radio access technology, the reference signals of the first radio access technology being located at a first symbol location within the downlink transmission when the reference signals of the first radio access technology are determined not to collide with reference signals of the second radio access technology, and the reference signals of the first radio access technology being located at a second symbol location within the downlink transmission when the reference signals of the first radio access technology are determined to collide with the reference signals of the second radio access technology, the second symbol location being either before the first symbol location or after the first symbol location.

7. The radio network node of claim 6, wherein the parameter is a lte-CRS-ToMatchAround parameter.

8. The radio network node of claim 6, wherein the second symbol location is either at least one symbol before the first symbol location or at least one symbol after the first symbol location.

9. The radio network node of claim 6, wherein the reference signals of the first radio access technology are demodulation reference signals, DMRS.

10. The radio network node of claim 6, wherein the reference signals of the second radio access technology are common or cell reference signals, CRS.

11. A method in a wireless device, the wireless device operating according to a first radio access technology, the method comprising:
receiving an indication from a radio network node operating according to the first radio access technology and to a second radio access technology, the first and second radio access technologies using a same subcarrier spacing, the indication indicating that the first radio access technology and the second radio access technology are coexisting on a same carrier, the indication being a parameter in an information element of a Radio Resource Control, RRC, message:
receiving a downlink transmission from the radio network node, the downlink transmission including reference signals of the first radio access technology, the reference signals of the first radio access technology being located at a first symbol location within the downlink transmission when the reference signals of the first radio access technology are determined not to collide with reference signals of the second radio access technology, and the reference signals of the first radio access technology being located at a second symbol location within the downlink transmission when the reference signals of the first radio access technology are determined to collide with the reference signals of the second radio access technology, the second symbol location being either before the first symbol location or after the first symbol location.

12. The method of claim 11, wherein the parameter is a lte-CRS-ToMatchAround parameter.

13. The method of claim 11, wherein the second symbol location is either at least one symbol before the first symbol location or at least one symbol after the first symbol location.

14. The method of claim 11, wherein the reference signals of the first radio access technology are demodulation reference signals, DMRS.

15. The method of claim 11, wherein the reference signals of the second radio access technology are common or cell reference signals, CRS.

16. A wireless device configured to operate according to a first radio access technology, the wireless device adapted to:
receive an indication from a radio network node operating according to the first radio access technology and to a second radio access technology, the first and second radio access technologies using a same subcarrier spacing, the indication indicating that the first radio access technology and the second radio access technology are coexisting on a same carrier the indication being a parameter in an information element of a Radio Resource Control, RRC, message;
receive a downlink transmission from the radio network node, the downlink transmission including reference signals of the first radio access technology, the reference signals of the first radio access technology being located at a first symbol location within the downlink transmission when the reference signals of the first radio access technology are determined not to collide with reference signals of the second radio access technology, and the reference signals of the first radio access technology being located at a second symbol location within the downlink transmission when the reference signals of the first radio access technology are determined to collide with the reference signals of the second radio access technology, the second symbol location being either before the first symbol location or after the first symbol location.

17. The wireless device of claim 16, wherein the parameter is a lte-CRS-ToMatchAround parameter.

18. The wireless device of claim 16, wherein the second symbol location is either at least one symbol before the first symbol location or at least one symbol after the first symbol location.

19. The wireless device of claim 16, wherein the reference signals of the first radio access technology are demodulation reference signals, DMRS.

20. The wireless device of claim 16, wherein the reference signals of the second radio access technology are common or cell reference signals, CRS.

* * * * *